(12) United States Patent
Kang et al.

(10) Patent No.: US 7,431,838 B2
(45) Date of Patent: Oct. 7, 2008

(54) GAS/ION SPECIES SELECTIVE MEMBRANE SUPPORT BY MULTI-STAGE NANO-HOLE ARRAY METAL STRUCTURE

(75) Inventors: Sangkyun Kang, Seongnam-Si (KR);
Yong-Il Park, Kyungbuk (KR);
Friedrich B. Prinz, Woodside, CA (US);
Suk-Won Cha, Stanford, CA (US); Yuji Saito, Tokyo (JP); Ali Farvid, Palo Alto, CA (US); Pei-Chen Su, Stanford, CA (US)

(73) Assignees: The Board of Trustees of the Leland Stanford Junior University, Palo Alto, CA (US); Honda Motor Co., Ltd, Tokyo (JP)

( * ) Notice: Subject to any disclaimer, the term of this patent is extended or adjusted under 35 U.S.C. 154(b) by 139 days.

(21) Appl. No.: 11/502,140

(22) Filed: Aug. 9, 2006

(65) Prior Publication Data

US 2006/0273004 A1    Dec. 7, 2006

Related U.S. Application Data

(62) Division of application No. 11/090,658, filed on Mar. 25, 2005, now Pat. No. 7,108,813.

(60) Provisional application No. 60/558,351, filed on Mar. 30, 2004.

(51) Int. Cl.
*B01D 39/00* (2006.01)
*B01D 17/00* (2006.01)
*B01D 24/00* (2006.01)
*B01D 63/00* (2006.01)
*B32B 15/00* (2006.01)

(52) U.S. Cl. ............... 210/500.25; 210/490; 210/523.2; 210/321.6; 96/77; 55/523; 55/524; 428/548; 428/457; 428/381

(58) Field of Classification Search ............ 210/500.25, 210/523.2, 321, 6, 490; 55/523, 524, 487; 427/250, 405; 95/54, 56; 428/548, 457, 428/381.1

See application file for complete search history.

(56) References Cited

U.S. PATENT DOCUMENTS

| | | | | |
|---|---|---|---|---|
| 4,857,080 A | * | 8/1989 | Baker et al. | 95/56 |
| 5,652,020 A | * | 7/1997 | Collins et al. | 427/230 |
| 5,756,207 A | * | 5/1998 | Clough et al. | 428/375 |
| 6,159,987 A | * | 12/2000 | Yamamoto et al. | 514/299 |

(Continued)

*Primary Examiner*—Ana M Fortuna
(74) *Attorney, Agent, or Firm*—Lument Patent Firm, Inc.

(57) ABSTRACT

An improved two-step replication process for fabrication of porous metallic membranes is provided. A negative of a porous non-metallic template is made by infiltration of a liquid precursor into the template, curing the precursor to form a solid negative, and removing the template to expose the negative. Metal is deposited to surround the exposed negative. Removal of the negative provides a porous metallic membrane having pores which replicate the pores of the original template membrane. The negative is kept immersed in a liquid at all times between removing the template and depositing the metal. This immersion eliminates damage to the negative that would be incurred in drying the negative out between these processing steps. Another aspect of the invention is metallic membranes prepared according to the preceding method. For example, metallic membranes having pores smaller on one side than on the other side of the membrane are provided.

14 Claims, 6 Drawing Sheets

U.S. PATENT DOCUMENTS 6,649,559 B2 * 11/2003 Drost et al. .................. 502/182
7,108,813 B2 * 9/2006 Kang et al. ................... 264/42
7,175,694 B2 * 2/2007 Ma et al. ....................... 95/56
7,255,726 B2 * 8/2007 Ma et al. ....................... 95/56

* cited by examiner

GAS/ION SPECIES SELECTIVE MEMBRANE SUPPORT BY MULTI-STAGE NANO-HOLE ARRAY METAL STRUCTURE

CROSS REFERENCE TO RELATED APPLICATIONS

This application is a divisional of application Ser. No. 11/090,658, filed Mar. 25, 2005 now U.S. Pat. No. 7,108,813 and entitled "Gas/ion Species Selective Membrane Supported by Multi-Stage Nano-Hole Array Metal Structure". application Ser. No. 11/090,658 claims the benefit of U.S. provisional application Ser. No. 60/558,351, filed on Mar. 30, 2004, entitled "Gas/ion Species Selective Membrane Supported by Multi-Stage Nano-Hole Array Metal Structure".

FIELD OF THE INVENTION

This invention relates to providing support for a thin gas or ion species selective membrane.

BACKGROUND

Porous membranes are of interest for various applications, such as fuel cells, gas separation and gas sensing. Porous membranes are often used as active and/or as supporting layers in fuel cells, e.g., as considered in U.S. Pat. Nos. 5,998,058, 6,720,105, 6,743,543, and US 2004/0013924. Examples of application of porous membranes for gas separation include U.S. Pat. Nos. 4,857,080 and 5,498,278. Further examples of conventional porous membranes include U.S. Pat. Nos. 5,734,092, 6,027,796 and 6,562,446.

Although both metallic and non-metallic porous membranes are known, metallic membranes are preferred for many applications. For example, a metallic support membrane for a fuel cell provides an attractive combination of electrical conductivity and mechanical durability (e.g., resistance to cracking and breaking). Exemplary discussions of porous metallic membranes include U.S. Pat. Nos. 6,368,751, 6,649,559, 6,797,422 and US 2002/0028345. Various methods are known for fabricating porous metallic membranes. For example, US 2002/0028345 considers cold working a pore-free composite of two compositions, where one of the compositions is removed after the cold working to provide a porous metallic structure. In U.S. Pat. No. 6,649,559, removal of one phase of a two phase composite to provide a porous metallic structure is considered. In U.S. Pat. Nos. 6,338,751 and 6,797,422, commercial availability of porous metal foams is indicated.

Porous metallic membranes have also been fabricated using a two step replication process. This replication process begins with a non-metallic porous template. A negative of this template is formed by filling the pores of the template with a suitable negative material. After filling the pores, the original template is removed, exposing the negative. The desired metallic composition is then deposited on the negative, and the parts of the negative that initially filled the pores of the template form corresponding pores in the metallic structure. Finally, the negative is removed to provide the porous metallic membrane.

Such two step replication has been considered by various authors. References include: Lei et al., "Preparation of highly ordered nanoporous Co membranes assembled by small quantum-sized Co particles", J. Vac. Sci. Tech. vB19(4), pp 1109-1114, 2001; Masuda et al., "Ordered Metal Nanohole Arrays Made by a Two-Step Replication of Honeycomb Structures of Anodic Alumina", Science v268, pp 1466-1468, 1995; Masuda et al., "Fabrication of Pt microporous electrodes from anodic porous alumina and immobilization of GOD into their micropores", J. Electroanalytical Chem., v368, pp 333-336, 1994; Masuda et al., "Fabrication of Porous $TiO_2$ Films using two-step replication of microstructure of anodic alumina", Jpn. J. Appl. Phys. v31(12B) pt 2, pp L1775-L1777, 1992; Masuda et al., "Preparation of Porous Material by Replacing Microstructure of Anodic Alumina Film with Metal", Chem. Lett., pp 621-222, 1990; Jiang et al., "Electrodeposited Metal Sulfide Semiconductor Films with Ordered Nanohole Array Structures", Langmuir v17, pp 3635-3638, 2001; and Jiang et al., "Ordered Porous Films of Organically-Modified Silica Prepared by a Two-Step Replicating Process", Colloids and Surfaces A v179, pp 237-241, 2001.

Two step replication is most useful in cases where it is easier to obtain the desired pore geometry in a non-metallic template material rather than directly in the metallic composition of interest. However, difficulties have been noted in the art relating to two step replication, e.g., in structures having high aspect ratio pores.

It is generally desirable to have a large degree of control over the pore geometry. For example, it is often desirable to combine high gas transfer rate with small pore size in a mechanically sturdy (i.e., relatively thick) membrane. For a single-stage membranes having the same pore size throughout the membrane, these goals are incompatible, thus requiring a designer to make a compromise. However, this problem can be addressed by making use of a two-stage membrane, having a thin small-pore region and a thick large pore-region. Such a two-stage membrane can simultaneously provide mechanical strength in combination with small pore size and high flow rate. The general idea is similar to the known idea of providing a suitable mechanical support structure for a permeable membrane (e.g., as considered in U.S. Pat. No. 3,505, 180).

However, for micro-porous membranes, macroscopic fabrication approaches (e.g., as considered in U.S. Pat. No. 3,505,180) are generally inapplicable. Examples of known two-stage microporous membranes include U.S. Pat. Nos. 5,114,803, 5,262,021, 5,308,712, and 5,620,807. A noteworthy feature of these examples is that they all relate to non-metallic membranes. Also, as expected for microfabrication technology, the fabrication techniques employed tend to be material-specific. Non-metallic two-stage membranes are also commercially available. For example, some of the Anodisc® membranes provided by Whattman are two-stage alumina membranes. However, we are not aware of any example of two-stage microporous metallic membranes in the art.

Accordingly, it would be an advance in the art to provide metallic two-stage porous membranes, and to provide methods for making such membranes.

SUMMARY

This need is addressed by the present invention, which provides porous metallic membranes via an improved two-step replication process. A negative of a porous non-metallic template is made by infiltration of a liquid precursor into the template, curing the precursor to form a solid negative, and removing the template to expose the negative. Metal is deposited to surround the exposed negative. Removal of the negative provides a porous metallic membrane having pores which replicate the pores of the original template membrane. A key aspect of the invention is keeping the negative immersed in a liquid at all times between removing the template and depositing the metal. This immersion eliminates damage to the negative that would be incurred in drying the negative out between these processing steps. Another aspect of the invention is metallic membranes prepared according to the preceding method. For example, metallic membranes having pores smaller on one side than on the other side of the membrane are provided.

DETAILED DESCRIPTION

Figure 1:
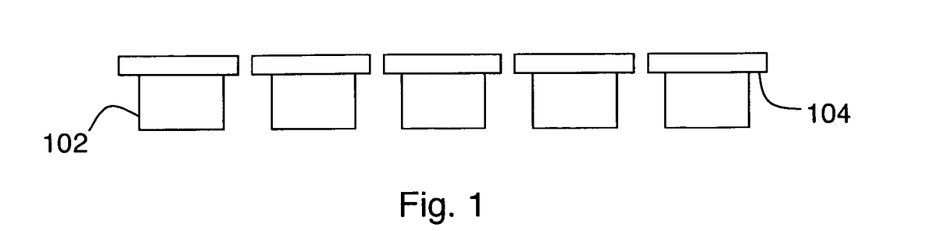
FIG. 1 shows a two-stage porous metallic membrane according to an embodiment of the invention.

FIG. 1 shows a two-stage porous metallic membrane support structure according to an embodiment of the invention. The membrane of FIG. 1 has a first region 104 having a first pore size and a second region 102 having a second pore size. The second pore size is larger than the first pore size, as shown on FIG. 1. Although division of a membrane into two distinct regions each having a different pore sizes as shown on FIG. 1 is a preferred embodiment, this particular structure is not required to practice the invention. A key point in structures of the invention is that the metallic porous membrane have opposing surfaces with different pore sizes at these surfaces. Within the membrane, the pore size can change abruptly at an internal interface (e.g., as shown on FIG. 1) and/or can change gradually.

Metallic membranes according to the invention are preferably micro-porous. More specifically, the first pore size is preferably about 20 nm to about 30 nm and the second pore size is preferably about 200 nm to about 300 nm. For many applications (e.g., fuel cell technology and gas separation) it is desirable for porous membranes to have a very large diameter relative to pore size. Accordingly, it is preferred for membranes of the invention to have a diameter or lateral extent greater than about 1 cm. Fabrication of such membranes according to methods of the invention is discussed below in connection with FIGS. 3a-g.

Although the invention can be practiced with any metallic material or composition, preferred compositions include nickel, platinum, palladium, gold, copper or alloys or mixtures thereof. Membranes of the invention can include one or more different metallic compositions. Regions 102 and 104 can have the same or different compositions. Region 102 (and/or region 104) can itself include one or more different metallic compositions. For example, region 102 can be mostly Ni except for a thin layer of Pt at the interface with region 104. Such multiple compositions can be used to reduce cost (e.g., if Pt is needed in region 102 to make contact with first region 104). Also, in some cases region 104 can act as a catalyst, while region 102 does not. Thus differing functionality is another motivation for having differing compositions in the two regions.

A major application of membranes of the invention is to fuel cell technology. More specifically, fuel cells often include an active membrane (i.e., a gas or ion species selective membrane). Such active membranes can be either single layer membranes or multiple layer membranes, and both possibilities are covered by the term "membrane assembly". The membrane assembly of a fuel cell is where the electrochemical reactions of the cell take place. The active membrane assembly of a fuel cell is often mechanically supported by one or more support membranes. Membranes of the present invention can be advantageously used as fuel cell support membranes.

Figure 2:
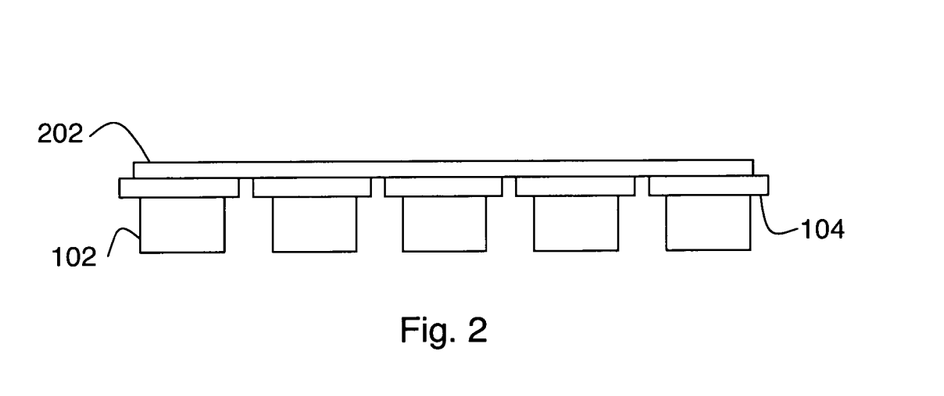
FIG. 2 shows a gas/ion selective membrane assembly according to an embodiment of the invention.

Accordingly, FIG. 2 shows a gas/ion selective membrane assembly according to an embodiment of the invention. A gas or ion species selective membrane assembly 202 is in contact with first region 104 (i.e., the small pore region) of the metallic membrane of FIG. 1. There are several advantages of this arrangement. The metallic nature of the support membrane including regions 102 and 104 provides electrical conductivity in combination with desirable mechanical properties (e.g., ductility, resistance to breakage, etc.). The dual-stage pores advantageously increase the ability of chemical reactants to enter (or leave) membrane assembly 202. Membrane assembly 202 is frequently thin and mechanically fragile, and the small pores of region 104 are helpful for providing adequate mechanical support in such case. Simultaneously, the large pores of region 102 provide greatly improved reactant flow compared to a support membrane of the same thickness but having the small pore size throughout. Preferably region 104 is much thinner than region 102. For example, in a preferred embodiment, region 104 has a thickness of about 70 nm and region 102 has a thickness of about 20 μm to about 40 μm. It is further preferred for region 104 to have a pore size of about 20 nm to about 40 nm on the surface adjacent to membrane assembly 202 and a pore size of about 70 nm to about 100 nm on the surface facing away from membrane assembly 202. It is also preferred for region 102 to have a pore size of about 200 nm to about 300 nm throughout its thickness. This arrangement of pore sizes provides mechanical strength for the support membrane including regions 102 and 104, and provides ease of reactant flow to membrane assembly 202.

Preferably, membrane assembly 202 has a thickness of less than 1 μm. Any gas or ion species selective membrane can be used in this embodiment of the invention. Exemplary materials for membrane assembly 202 include yttrium-stabilized zirconia, gadolinium doped ceria, palladium, and barium zirconate. In some cases membrane assembly 202 includes a porous catalyst layer. Such a catalyst layer preferably has a pore size of about 20 nm to about 40 nm, and preferably includes platinum, nickel, palladium, gold, or alloys or mixtures thereof.

Figure 3A:
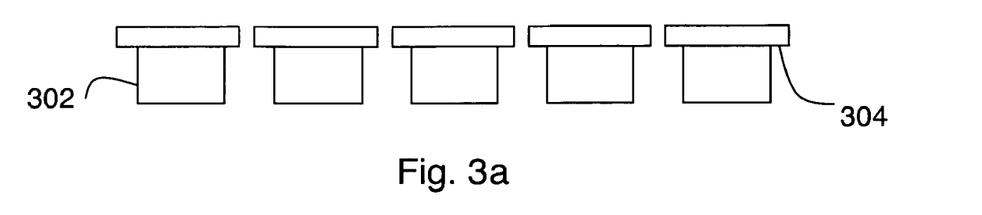
FIGS. 3a-g show a method of making a two-stage porous metallic membrane according to an embodiment of the invention.

FIGS. 3a-g show a method of making a two-stage porous metallic membrane according to an embodiment of the invention. FIG. 3a shows providing a porous non-metallic template membrane having a small pore region 304 and a large pore region 302. Although such division of the template membrane into two regions having different pore sizes is not required to practice this method of the invention, it is preferred. Any material which is compatible with the following method steps can be employed for the template membrane. Materials known to be suitable for the template membrane include alumina and silicon.

Figure 3B:
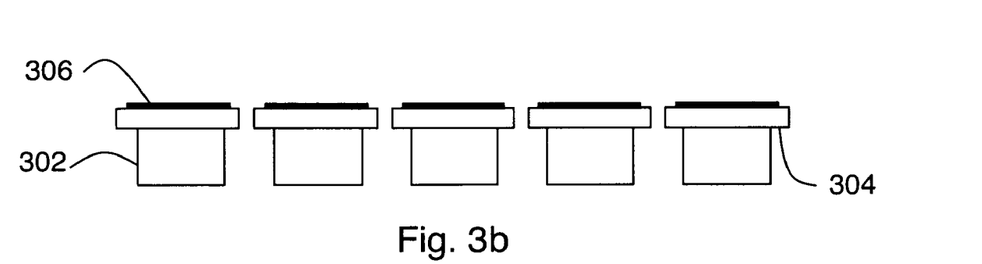

FIG. 3b shows depositing a first metal layer 306 on a surface of the small pore region 304 such that pores on this surface are not blocked by the first metal layer. The resulting metal layer 306 can include two or more different metallic compositions, or can be of a single composition. The first layer of metal 306 can have two functions: 1) it can act as a seed layer for a subsequent electroplating process step as shown below and 2) it can act as a catalyst layer. Since the first metal layer can directly touch the gas/ion selective membrane (e.g., as on FIG. 3g), the catalysis function is particularly advantageous in electrochemical device applications. It is preferred for first metal layer 306 to be sufficiently thick to provide enough electrical conductivity to facilitate a later electroplating deposition step. We have found that RF sputtering of Pt at conditions (100 W applied RF power, 1 Pa pressure, Ar ambient) providing a deposition rate of about 1 nm/s provides good results. The resulting thickness of first layer 306 is estimated to be about 30 nm to about 40 nm of Pt. For other embodiments of the invention, some routine experimentation may be needed to determine how thick first metal 306 should be to provide good subsequent electroplating results, and how best to deposit this layer.

Figure 3C:
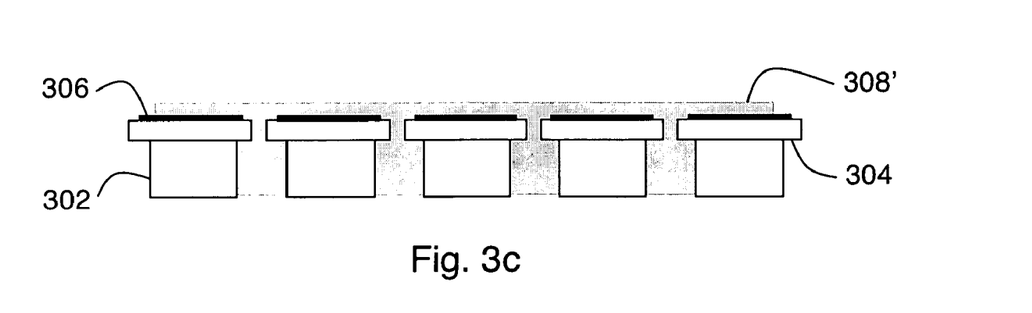

FIG. 3c shows providing a polymer negative of the template membrane. More specifically, spaces within the template membrane can be filled with a liquid polymer precursor 308'. Polymer precursor 308' can then be cured to provide a polymer negative 308. Suitable materials for polymer precursor 308' include methyl-methacrylate (MMA), and mixtures of poly-MMA and MMA. Suitable curing methods for generating polymer negative 308 from polymer precursor 308' include thermal curing and exposing precursor 308' to ultraviolet radiation (preferably in a nitrogen ambient). These polymer precursor materials and curing methods are exemplary, and the invention can be practiced with any material for the polymer negative that is compatible with other processing steps.

It is important that polymer negative 308 not extend past the pores in region 302 of the template membrane, since access to the template membrane is needed for further processing. Allowing capillary flow of polymer precursor 308' into the pores is a preferred method for providing the polymer precursor 308' and polymer negative 308. In this approach, the top surface of the structure shown on FIG. 3b is placed into contact with a bath of polymer precursor 308'. Polymer precursor 308' is then drawn into the pores by capillary action to provide the configuration shown in FIG. 3c. This aspect of the invention is one reason it is important for the first metal 306 to not block the pores.

Figure 3D:
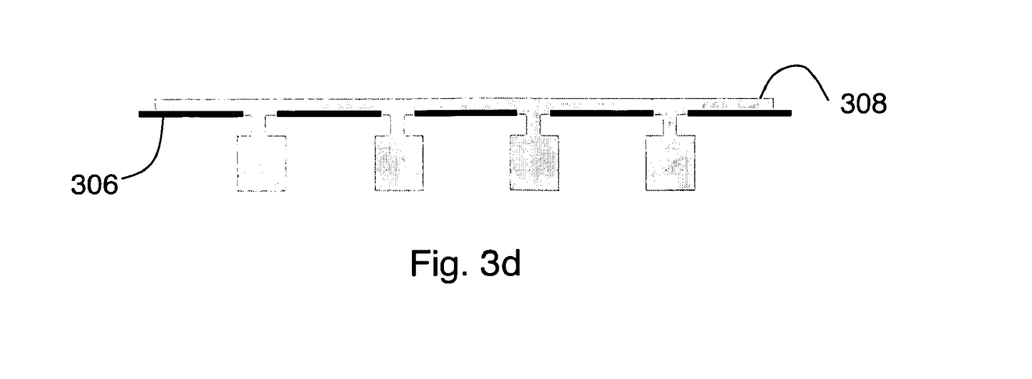
Figure 3E:
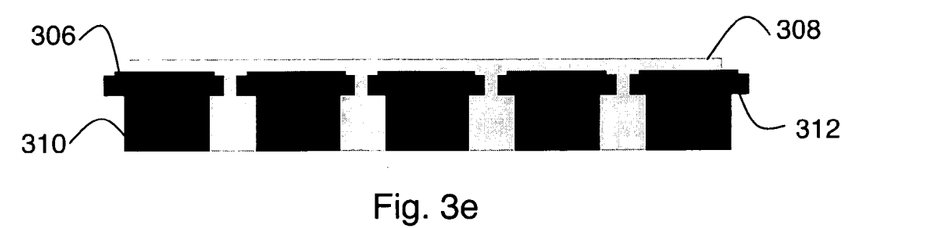

FIG. 3d shows removing the non-metallic template membrane to expose pore-filling parts of polymer negative 308. For example, this operation can be performed by etching away the template membrane with an etchant. Any etchant that preferentially dissolves the template membrane compared to the polymer negative 308 is suitable. For example, a basic solution is suitable for dissolving an alumina template membrane. FIG. 3e shows depositing a second metal (310 and 312) onto first metal 306 such that the second metal makes contact with (e.g., surrounds) the pore-filling parts of the polymer negative 308. The second metal is preferably deposited via electroplating, although any deposition technique compatible with the other method steps can also be employed. However, electroless plating of Nickel has been found to provide unsatisfactory results, since Nickel deposited in this manner tends to be porous and fragile. It is preferred for the deposition of the second metal to provide dense metal, so that the only pores in the resulting structure are determined by negative 308. The second metal can be of a single composition, or can include two or more different metallic compositions.

A key aspect of the invention is keeping the polymer negative 308 immersed in a liquid at all times between removal of the template membrane and deposition of the second metal. Drying of polymer negative 308 after removal of the template membrane is thereby avoided in practicing the invention. Such avoidance of drying is highly advantageous, since drying the polymer negative 308 can often degrade its porous structure. For example, parts of the polymer negative can be drawn to each other (and may even bond) by surface tension forces experienced during drying. Polymer negatives for pores having a high aspect ratio and/or for multi-stage pores having different sizes in different regions are especially vulnerable to drying-induced degradation. For example, the negative for micro-pores having a high aspect ratio is a large number of long thin pillars, which can readily and undesirably "clump" together upon being dried out. Similarly, a negative for a network of interconnected pores can partially or even completely collapse upon being dried out. Thus, avoidance of drying according to the invention is especially advantageous for such structures.

Figure 3F:
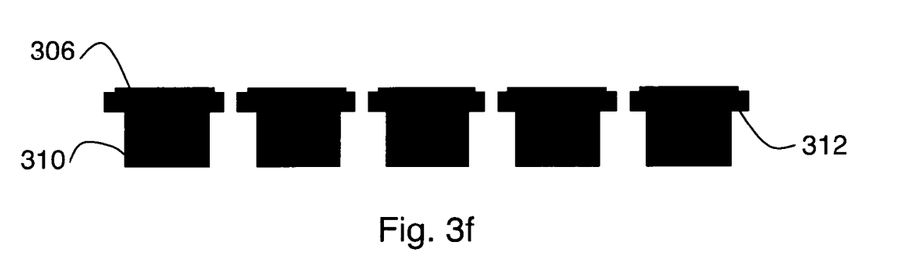

FIG. 3f shows removing of polymer negative 308 after depositing the second metal. Such removing can be performed with any solvent that preferentially dissolves polymer negative 308 compared to the metal regions (306, 310 and 312). Suitable solvents include acetone, toluene, methyl ethyl ketone, formaldehyde, and mixtures thereof. Comparison of FIG. 3f to FIG. 3a shows that the porous metal membrane obtained by this method is a replica of the template membrane of FIG. 3a. Thus regions 312 and 310 are small pore and large pore regions, respectively, of a two-stage microporous metallic membrane.

Figure 3G:
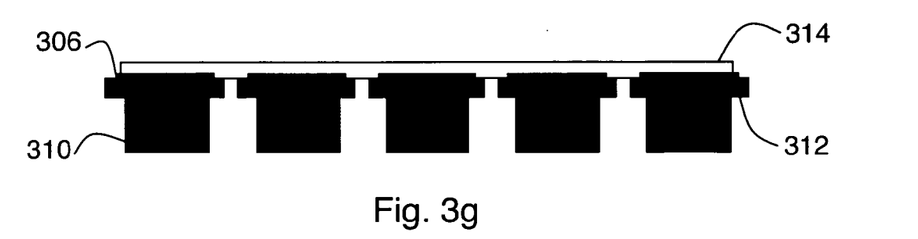

Optionally, further processing steps can be performed. For example, FIG. 3g shows depositing a gas or ion species selective membrane 314 on the porous metallic membrane. Suitable methods for depositing the selective membrane 314 include: atomic layer deposition; pulsed laser deposition; sputtering of a metal followed by oxidizing the sputtered metal; RF sputtering of a metal oxide; and sputtering of a metal.

Figure 4:
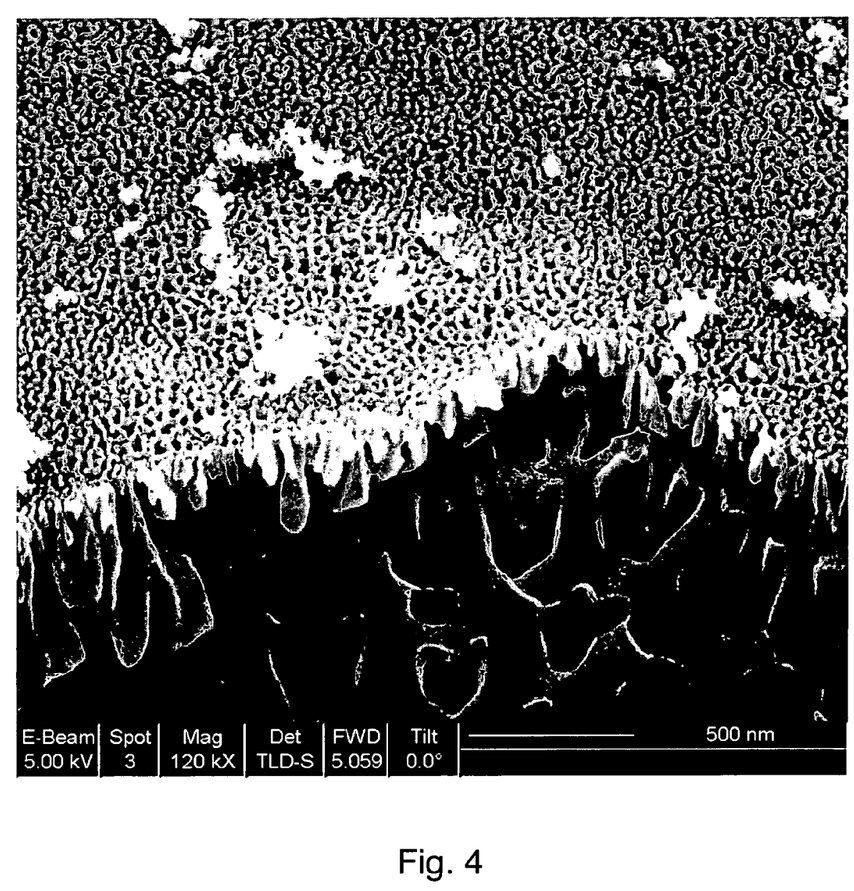
FIG. 4 shows an SEM photograph of a template membrane suitable for use with the method of FIGS. 3a-g.

FIG. 4 shows an SEM photograph of a template membrane suitable for use with the method of FIGS. 3a-g. This example shows a porous alumina membrane having a small pore region (at the top) with about 20 nm pores, and a large pore region (at the bottom) with about 200 nm pores.

Figure 5:
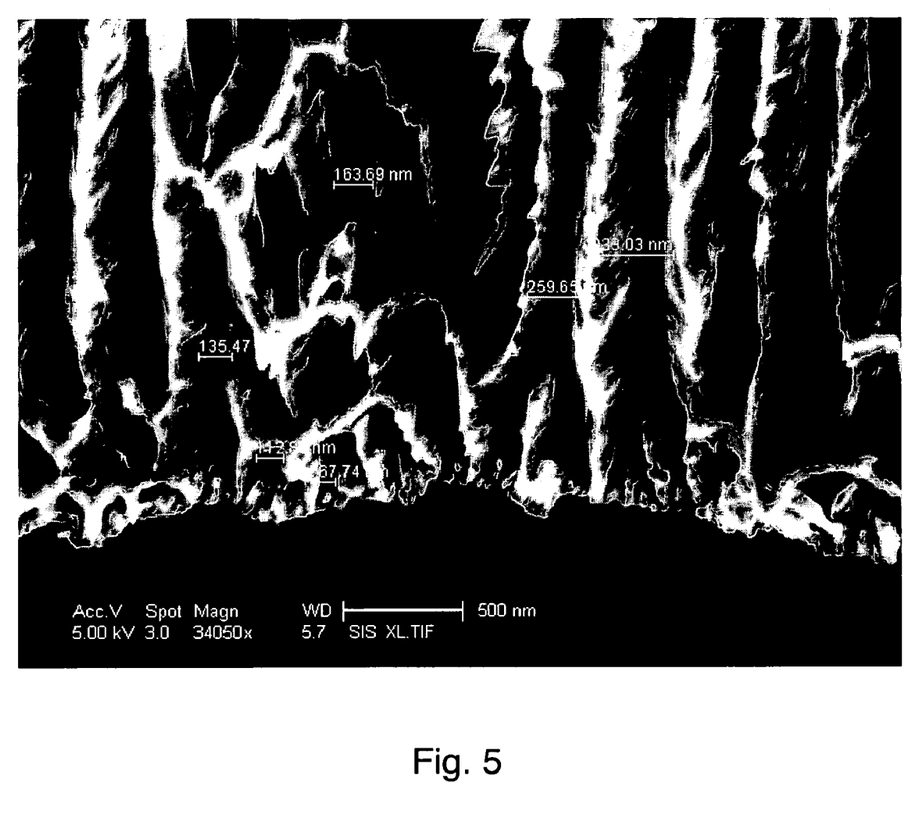
FIG. 5 shows an SEM photograph of a two-stage porous metallic membrane according to an embodiment of the invention.

FIG. 5 shows an SEM photograph of a two-stage porous metallic membrane according to an embodiment of the invention. The example of FIG. 5 was fabricated by application of the method of FIGS. 3a-f to an alumina membrane similar to that of FIG. 4. The metal of this example is Ni. Here, the small pore region is at the bottom of FIG. 5, and the large pore region is at the top of FIG. 5.

Figure 6:
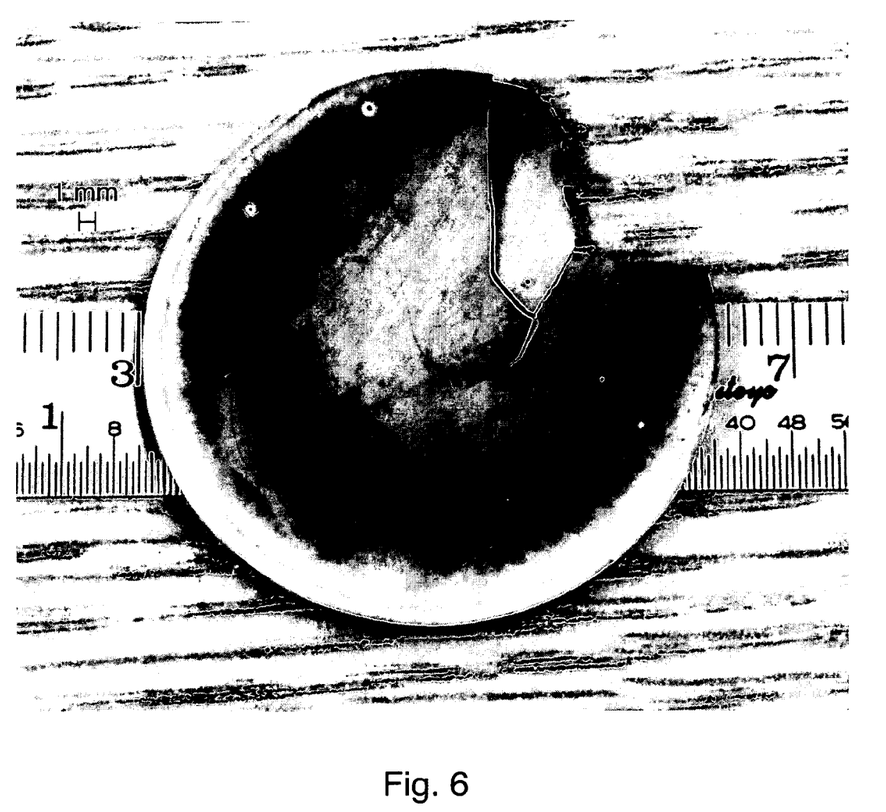
FIG. 6 shows a photograph of a two-stage porous metallic membrane according to an embodiment of the invention.

FIG. 6 shows a photograph of a two-stage porous metallic membrane according to an embodiment of the invention. Here it is apparent that large diameter two-stage porous metallic membranes are provided by the invention, since the membrane diameter of this example is 35 mm.

The preceding description has been by way of example as opposed to limitation, and the invention can also be practiced according to many modifications of the provided examples. For example, FIGS. 1-3g show individual pores, and FIGS. 4-6 show networks of interconnected pores. The invention can be practiced with any combination of individual pores and/or a network of interconnected pores, although a porous network is preferred because it is easier to provide a negative for a porous network than for individual pores.

A noteworthy feature of a porous network is that the porosity (defined as the pore area divided by the total area of a given surface) can be comparable on two opposing surfaces of a membrane, even if the pore sizes are different on the two surfaces. For example, a metal membrane fabricated according to the invention having ~20 nm pores on one surface and ~200 nm pores on an opposite surface had a porosity of about 30% to 35% on the 20 nm side, and about 30% to 40% on the 200 nm side.

The invention claimed is:

1. Apparatus comprising:

a porous metallic membrane having opposite first and second surfaces;

wherein the membrane has a first pore size at the first surface and has a second pore size at the second surface;

wherein the second pore size is greater than the first pore size;

wherein the membrane has a first region including the first surface and a second region including the second surface, and wherein the first region and the second region are adjacent to each other at an interface;

wherein an interface pore size of the first region at the interface is greater than the first pore size and less than the second pore size.

2. The apparatus of claim 1, wherein said first pore size is about 20 nm to about 30 nm and said second pore size is about 200 nm to about 300 nm.

3. The apparatus of claim 1, wherein said metallic membrane has a diameter greater than 1 cm.

4. The apparatus of claim 1, wherein said membrane includes two or more different metallic compositions.

5. The apparatus of claim 1, wherein said metallic membrane comprises nickel, platinum, palladium, gold, copper or an alloy or mixture thereof.

6. The apparatus of claim 1, wherein said interface pore size is about 70 nm to about 100 nm.

7. The apparatus of claim 1, wherein a thickness of said second region is greater than a thickness of said first region.

8. The apparatus of claim 1, wherein said first region has a thickness of about 70 nm, and wherein said second region has a thickness of about 20 μm to about 40 μm.

9. A supported membrane assembly comprising:

a) a porous metallic support membrane having opposite first and second surfaces;

wherein the support membrane has a first pore size at the first surface and has a second pore size at the second surface;

wherein the second pore size is greater than the first pore size;

wherein the support membrane has a first region including the first surface and a second region including the second surface, and wherein the first region and the second region are adjacent to each other at an interface;

wherein an interface pore size of the first region at the interface is greater than the first pore size and less than the second pore size; and b) a gas or ion species selective membrane assembly in contact with the first surface.

10. The supported membrane assembly of claim 9, wherein said selective membrane assembly has a thickness less than 1 μm and comprises a material selected from the group consisting of: yttrium-stabilized zirconia, gadolinium doped ceria, palladium, and barium zirconate.

11. The supported membrane assembly of claim 9, wherein said selective membrane assembly comprises a catalyst layer having a pore size of about 20 nm to about 40 nm and including a material selected from the group consisting of: platinum, nickel, palladium, gold, and alloys or mixtures thereof.

12. The supported membrane assembly of claim 9, wherein said first region has a thickness of about 70 nm and said first pore size is about 20 nm to about 40 nm, and wherein said interface pore size is about 70 nm to about 100 nm.

13. The supported membrane assembly of claim 9, wherein said second region has a thickness of about 20 μm to about 40 μm and said second pore size is about 200 nm to about 300 nm.

14. The supported membrane assembly of claim 9, wherein a thickness of said second region is greater than a thickness of said first region.

* * * * *